(12) United States Patent
Sykes et al.

(10) Patent No.: US 9,019,095 B2
(45) Date of Patent: Apr. 28, 2015

(54) SYSTEMS AND METHODS FOR INTEGRATING ALARM PROCESSING AND PRESENTATION OF ALARMS FOR A POWER GENERATION SYSTEM

(71) Applicant: General Electric Company, Schnectady, NY (US)

(72) Inventors: Justin Alexander Sykes, Atlanta, GA (US); Scott Wood, Atlanta, GA (US); Jia Q. Ma, Atlanta, GA (US); Dibakar Chandra, Atlanta, GA (US); William Darryl Herbert, Atlanta, GA (US); Craig Foster, Atlanta, GA (US)

(73) Assignee: General Electric Company, Schenectady, NY (US)

( * ) Notice: Subject to any disclaimer, the term of this patent is extended or adjusted under 35 U.S.C. 154(b) by 88 days.

(21) Appl. No.: 13/708,405

(22) Filed: Dec. 7, 2012

(65) Prior Publication Data

US 2014/0159907 A1 Jun. 12, 2014

(51) Int. Cl.
*G08B 23/00* (2006.01)
*G08B 21/18* (2006.01)
*F01K 23/00* (2006.01)
*G05B 23/02* (2006.01)

(52) U.S. Cl.
CPC .............. *F01K 23/00* (2013.01); *G05B 23/027* (2013.01)

(58) Field of Classification Search
USPC ......... 340/506, 511, 517, 521, 524, 525, 540, 340/3.1, 3.7, 5.33, 635; 700/80, 109, 287; 709/221
See application file for complete search history.

(56) References Cited

U.S. PATENT DOCUMENTS

| | | | | |
|---|---|---|---|---|
| 4,788,647 A * | 11/1988 | McManus et al. | ............ | 700/287 |
| 4,839,640 A * | 6/1989 | Ozer et al. | .................... | 340/5.33 |
| 6,223,091 B1 * | 4/2001 | Powell | ............................. | 700/80 |
| 6,690,980 B2 * | 2/2004 | Powell | ............................. | 700/80 |
| 7,557,702 B2 * | 7/2009 | Eryurek et al. | ................ | 340/511 |
| 2012/0025620 A1 * | 2/2012 | Stump et al. | .................... | 307/80 |
| 2014/0129688 A1 * | 5/2014 | Asenjo et al. | .................. | 709/221 |

* cited by examiner

*Primary Examiner* — Van T. Trieu
(74) *Attorney, Agent, or Firm* — Sutherland Asbill & Brennan LLP (57) ABSTRACT

Systems and methods for integrating alarm processing and presentation of alarms for a power generation system are described. A template or graphical user interface (GUI) for displaying information associated with alarms may be generated for various types of alarms. Information associated with an alarm may be identified based on certain criteria and stored in a template associated with the alarm for presentation to a user. One or more status messages may be output to a display such a that a user or other person responsible for responding to an alarm may receive a current status associated with an alarm, including that an alarm has been processed and is ready to be acted upon. An alarm may be analyzed, categorized, and escalated based on historical information associated with the alarm, as well as determinations made by a user based on information stored in a template associated with alarm.

17 Claims, 6 Drawing Sheets

SYSTEMS AND METHODS FOR INTEGRATING ALARM PROCESSING AND PRESENTATION OF ALARMS FOR A POWER GENERATION SYSTEM

TECHNICAL FIELD

Embodiments of the disclosure relate generally to incident reporting and, more particularly, to integrating alarm processing and presentation of alarms for a power generation system.

BACKGROUND OF THE DISCLOSURE

A power generation asset, such as a generator or turbine, may experience alarms for various reasons, such as an occurrence of an abnormal condition associated with a component in the power generation system. Existing systems and tools may be utilized to query databases or records for indications of such alarms and report the alarms to users who may be monitoring for the alarms. Such systems and tools, however, may require manual efforts from users to, for example, create and execute queries to collect information related to the alarms. Unfortunately, users may experience long delays before information related to the alarms is retrieved. Such delays may slow alarm reporting and resolution because, for example, users who may monitor power generation systems for alarms may be unaware when an alarm query has completed so that the users may act on the alarms.

BRIEF DESCRIPTION OF THE DISCLOSURE

Some or all of the above needs and/or problems may be addressed by certain embodiments of the disclosure. Certain embodiments may include systems and methods for integrating alarm processing and presentation of alarms for a power generation system. According to one embodiment, there is disclosed a method for receiving, by an alarm processing system comprising one or more computing devices, an alarm indicating an abnormal condition in a power generation asset; identifying, by the alarm processing system, data associated with the alarm; identifying, by the alarm processing system, a template for presenting at least a portion of the data based at least in part on a type of the alarm; updating, by the alarm processing system, the template with the data; and outputting, by the alarm processing system, to the display, at least one message providing at least one respective status associated with the alarm.

According to another embodiment, there is disclosed one or more computer-readable media storing computer-executable instructions that, when executed by at least one processor, configure the at least one processor to perform operations comprising receiving an alarm indicating an abnormal condition in a power generation asset, identifying data associated with the alarm, identifying a template for presenting at least a portion of the data based at least in part on a type of the alarm, updating the template with the data, and outputting, to the display, at least one message providing at least one respective status associated with the alarm.

According to a further embodiment, there is disclosed a system including at least one memory that stores computer-executable instructions and at least one processor configured to access the at least one memory and execute the computer-executable instructions to receive an alarm indicating an abnormal condition in a power generation asset, identify data associated with the alarm, identify a template for presenting at least a portion of the data based at least in part on a type of the alarm, update the template with the data, and output, to the display, at least one message providing at least one respective status associated with the alarm.

According to a further embodiment, there is disclosed a method for receiving, by an alarm processing system comprising one or more computing devices, an alarm indicating an abnormal condition in a power generation asset; identifying, by the alarm processing system, historical information associated with the alarm; determining, by the alarm processing system, a category associated with the alarm based at least in part on the historical information; when the category indicates that the alarm is actionable, sending a message to one or more user accounts associated with the alarm before an abnormal condition associated with the alarm occurs; and when the category indicates that the alarm requires assistance, sending the message to the one or more user accounts associated with the alarm requesting assistance to resolve an abnormal condition that has occurred in association with the alarm.

Other embodiments, systems, methods, apparatuses, aspects, and features of the disclosure will become apparent to those skilled in the art from the following detailed description, the accompanying drawings, and the appended claims.

BRIEF DESCRIPTION OF THE FIGURES

The detailed description is set forth with reference to the accompanying drawings, which are not necessarily drawn to scale. The use of the same reference numbers in different figures indicates similar or identical items, according to one embodiment of the disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers refer to like elements throughout.

DETAILED DESCRIPTION

Illustrative embodiments of the disclosure relate to, among other things, integrating the processing and presentation of alarms associated with power generation assets. As used herein, an alarm may refer to an indication that a component or piece of equipment associated with a power generation asset has experienced an abnormal condition or is no longer performing its intended purpose. One or more sensors may be associated with a power generation asset to provide such an indication to devices that may be in communication with the asset either directly or over a network. Such devices may be utilized to integrate the collection and presentation of alarms to users, for example, who may be responsible for responding to alarms in power generation equipment.

According to certain embodiments herein, a template may be generated for each type of alarm that may occur in a power generation asset. The template may include certain fields, components, or graphical objects, for example, that may receive data or other information associated with an alarm. In one embodiment, a template may be customized according to the type of an alarm. Such customization may be based on analysis of existing alarm details, or knowledge about which details are prevalent, recurring, or otherwise important for a particular type of alarm.

Power generation assets may be monitored for alarms and, when detected, the alarms may be received and stored for processing. In one embodiment, alarms may be stored in a queue based on a type of the alarm, a predefined priority associated with the alarm, and/or an age of the alarm. Upon receiving an alarm, information associated with the alarm may be identified by querying one or more information sources that may include information associated with assets. In one embodiment, such information may be identified based on a time in which an alarm was received. The identified information may be populated into a template associated with the alarm and output to a display, where the information may be viewed by a user or other person who may be responsible for responding to the alarm, according to one embodiment. One or more messages may also be output to the display to provide a user with a status regarding an alarm. For example, a user may receive a message indicating that a new alarm was received, a new alarm is currently being processed, and a new alarm has been processed and is ready to be acted upon, as non-limiting examples.

Illustrative embodiments of the disclosure may also relate to analysis and escalation of alarms. For example, alarms that are collected and presented to a user may be analyzed to determine whether the alarms may cause an anomaly in a power generation system, such as a component failure, system shutdown, or other abnormal conditions. Historical information associated with the alarms may be analyzed to make such a determination, in one embodiment. The alarms may be escalated to one or more user accounts or organizations that may be associated with the alarm for resolution, for example, if a determination is made that an alarm may cause an anomaly. In other embodiments, escalation of alarms may be based on user input. For example, a user may select certain alarms for escalation, enter details associated with the alarms, and cause an incident report associated with the alarm to be generated and dispositioned to one or more users or organizations for resolution.

The technical effects associated with certain embodiments herein may include, but are not limited to, timelier processing and reporting of alarms, which may lead to improved response times associated with resolving issues in power generation assets. According to certain embodiments herein, alarms may be automatically processed, associated with a template that is relevant to a type of the alarm, and output for display to a user or other person who may respond to the alarm. In this way, a user may not be required to initiate an alarm and monitor the processing of the alarm to, for example, determine whether all of the information associated with an alarm has been captured for analysis, which may facilitate the improvement response times mentioned above, as well as an increase in user efficiency.

Figure 1:
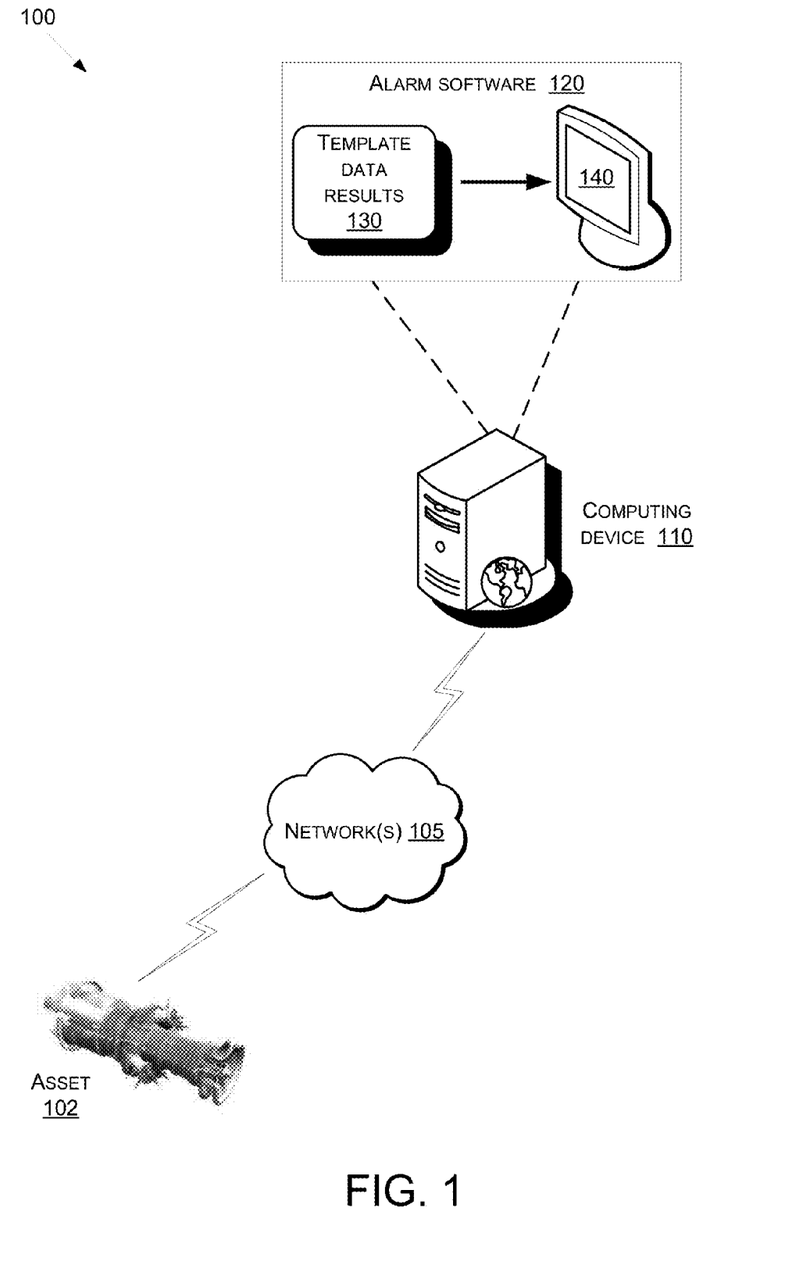
FIG. 1 illustrates an example computing system for implementing the processes described herein, according to an embodiment of the disclosure.

FIG. 1 depicts a computing system 100 (e.g., an input/output (IO) network) for implementing processes described herein (e.g., for processing alarms associated with an asset), according to one embodiment of the disclosure. As shown in FIG. 1, a computing device 110 may communicate with an asset 102, such as, but not limited to, a generator, a turbine (e.g., gas turbine or steam turbine), a compressor, or a motor, over one or more networks 105. The one or more networks 105 may include the Internet, intranets, or various other types of networks. In some embodiments, a network may not be used. According to these embodiments, a direct connection may exist between devices, e.g., the computing device 110 may be directly connected to the asset 102. The computing device 110, via one or more software programs or modules described in greater detail below, may perform a number of functions to implement or facilitate the processes described herein. For example, the computing device may monitor for an alarm, query data associated with the alarm based on various criteria (as will be described in greater detail below), store the data in a template associated with the alarm as template data results 130, and present the template data results 130 to the display 140, which may be viewed by one or more users or persons responsible for responding to the alarm.

Figure 2:
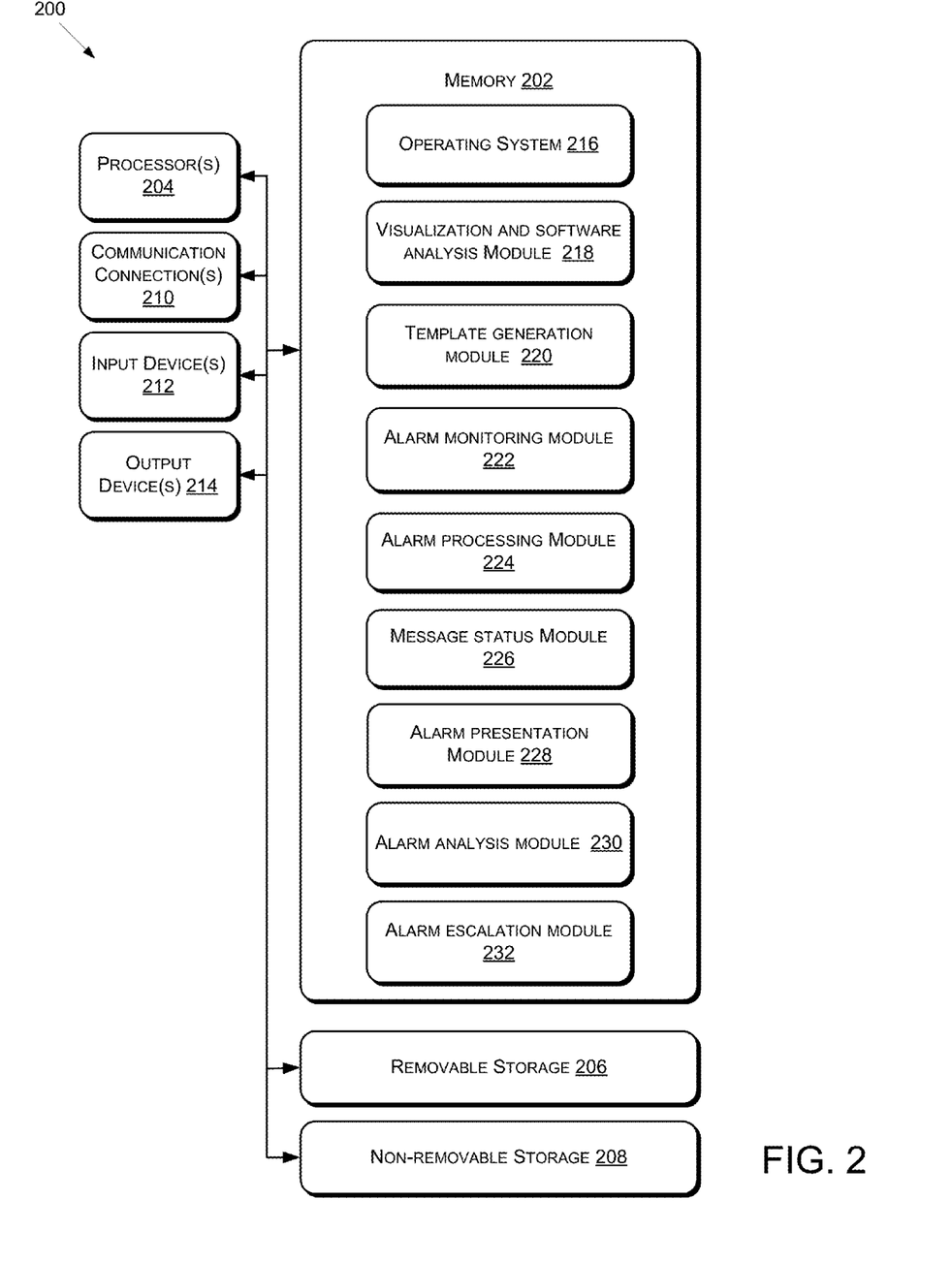
FIG. 2 illustrates an example computing environment for integrating alarm processing and presentation, according to an embodiment of the disclosure.

FIG. 2 depicts an example computing environment 200 for implementing processes described herein (e.g., integrating alarm processing and presentation), according to one embodiment of the disclosure. The computing environment 200 may include one or more computing devices, which may include, but are not limited to, a processor 204 capable of communicating with a memory 202. The computing environment 200 may embody the computing device 110, in one embodiment. The processor 204 may be implemented as appropriate in hardware, software, firmware, or combinations thereof. Software or firmware implementations of the processor 204 may include computer-executable or machine-executable instructions written in any suitable programming language to perform the various functions described.

A memory 202 may store program instructions that are loadable and executable on the processor 204, as well as data generated during the execution of these programs. Depending on the configuration and type of computing environment 200, a memory 202 may be volatile (such as random access memory (RAM)) and/or non-volatile (such as read-only memory (ROM), flash memory, etc.). In some embodiments, the devices may also include additional removable storage 206 and/or non-removable storage 208 including, but not limited to, magnetic storage, optical disks, and/or tape storage. The disk drives and their associated computer-readable media may provide non-volatile storage of computer-readable instructions, data structures, program modules, and other data for the devices. In some implementations, the memory 202 may include multiple different types of memory, such as static random access memory (SRAM), dynamic random access memory (DRAM), or ROM.

The memory 202, removable storage 206, and non-removable storage 208 are all examples of computer-readable storage media. For example, computer-readable storage media may include volatile and non-volatile, removable and non-removable media implemented in any method or technology for storage of information such as computer-readable instructions, data structures, program modules or other data. Additional types of computer storage media that may be present include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile discs (DVD) or other optical storage, magnetic cassettes, magnetic tapes, magnetic disk storage or other magnetic storage devices, or any other medium which can be used to store the desired information and which can be accessed by the devices. Combinations of any of the above should also be included within the scope of computer-readable media.

The computing environment 200 may also contain one or more communication connections 210 that allow the devices to communicate with devices or equipment capable of communicating with a computing device. The connections can be established via various data communication channels or ports, such as USB or COM ports to receive connections for cables connecting the devices, e.g., control devices, to various other devices in an IO network. Devices in the IO network 100, e.g., control devices, can include communication drivers such as Ethernet drivers that enable the devices to communicate with other devices on the IO network. According to various embodiments, the communication connections 210 may be established via a wired and/or wireless connection on the IO network. The computing environment 200 may also include one or more input devices 212, such as a keyboard, mouse, pen, voice input device, and touch input device. It may also include one or more output devices 214, such as a display, a printer, and speakers.

In other embodiments, however, computer-readable communication media may include computer-readable instructions, program modules, or other data transmitted within a data signal, such as a carrier wave, or other transmission. As used herein, however, computer-readable storage media does not include computer-readable communication media.

Turning to the contents of the memory 202, the memory 202 may include, but is not limited to, an operating system (OS) 216 and one or more application programs or modules for implementing the features and aspects disclosed herein. Such programs or modules may include, but are not limited to, a visualization and software analysis module 218, a template generation module 220, an alarm monitoring module 222, an alarm processing module 224, a message status module 226, an alarm presentation module 228, an alarm analysis module 230, and an alarm escalation module 232.

The visualization and software analysis module 218 may provide a graphical user interface (GUI) that includes a framework for enabling users to view information, such as alarm data or other details associated with an alarm. Such a framework may include windows, grids, tables, buttons, and other GUI components to facilitate such viewing. In one embodiment, the visualization and software analysis module 218 may be a commercial off the shelf (COTS) application. According to certain embodiments herein, the visualization and software analysis module 218 may be extended using various programming languages, such as C#, as a non-limiting example, to integrate the processing and presentation of alarms as described herein.

The template generation module 220 may enable the generation of templates for displaying alarm information. In one embodiment, the template generation module 220 may enable a user, for example, to select and organize certain GUI components for presenting a particular visualization or view of alarm information. The type and number of components selected for presenting alarm information, for example, may vary according to the type of alarm, in one embodiment. As an example, different visualizations may be presented for a turbine that experienced an alarm than a visualization presented for a component associated with a motor that experienced an alarm. As another example, different visualizations may be presented based on a failure mode associated with an asset. In one embodiment, a visualization determined for presenting details for a particular alarm may be based on existing knowledge about alarms, for example, as may be determined by systems or program modules that may analyze existing alarm data and/or specifications associated with an alarm to determine which data should be displayed in association with an alarm. In another embodiment, a user's existing knowledge, e.g., as recorded in an issue resolution issue, may be analyzed to determine which information associated with an alarm should be presented. According to one example, cycle time metrics associated with an alarm may be presented in a template. Such a template may be linked to or otherwise associated with another template (e.g., a primary or main template) associated with an alarm.

In addition to alarm information, other data or information that may identify an asset that experienced an alarm may also be included in the template. Such information may include a unique identifier associated with the asset, a description of the asset, a person or organization responsible for resolving issues associated with the asset, a location of the asset, a maintenance schedule associated with the asset, the date and time of the last inspection associated with the asset, or various other information that may identify an asset and may further facilitate the resolution of an alarm that occurred in the asset.

An alarm monitoring module 222 may monitor an asset 102 for an alarm. Upon detecting an alarm, the alarm monitoring module 222 may store the alarm for processing, e.g., by the alarm processing module 224, as will be described in greater detail below. In one embodiment, the alarm monitoring module 222 may store received alarms in a queue, such as a queue of multiple queues in which received alarms waiting to be processed may be stored. In one embodiment, the received alarms may be stored in the queue based on various information, such as, but not limited to, a predetermined priority associated with the alarm, the age of the alarm (i.e., an amount of time that has elapsed since the alarm occurred), and/or the type of alarm. In one aspect of the embodiment, alarms having the same predetermined priority may be stored in the same queue. Within such a queue, the alarms may be further ranked according to age. For example, newer, more critical alarms may be near the top of the queue such that they may be processed ahead of older, less critical alarms, in one embodiment. Alarms may be stored in queues according to different criteria, order, etc., in other embodiments.

The alarm processing module 224 may perform a number of functions to implement the processes described herein. One such function may include accessing alarms, for example, as stored in alarm queues. In one embodiment, the alarm processing module 224 may query the alarm queues to identify indications that alarms have occurred. Such indications may provide information identifying an asset that experienced an alarm, a particular component within an asset that experienced an alarm, a type of the alarm, or other information that may be utilized by the alarm processing module to identify the alarm. The alarm processing module 224 may analyze such information to determine which information to retrieve, such as data associated with the alarm or the asset that experienced an alarm (e.g., current measurements or readings regarding the current status, performance, etc., of components associated with an asset that experienced the alarm), which template in which to load the information, among other information.

In one embodiment, the template selected for displaying data associated with an alarm may be determined based at least in part on the type of the alarm. The data may be determined based at least in part on the time at which the alarm was received. For example, data associated with an asset that may be periodically or continuously reported may be identified (e.g., queried from a database storing such information) based on the time at which an alarm was received. In one embodiment, data for a particular time period, e.g., a certain amount of time before or after an alarm occurred, may be identified and used to compute a delta that may indicate a change in a reading associated with a component before and after the alarm occurred. Various other data, such as data that corresponds to one or more fields identified in a template associated with the alarm, may also be identified.

A message status module 226 may provide messages or updates regarding the current status associated with a request for alarm information. Such updates may inform a user, for example, that a new alarm has arrived and it is pending, the new alarm is being processed, the new alarm has been processed and is ready to be acted upon, or various other functions that may be performed to implement or facilitate the processes described herein. In one embodiment, one or more messages provided by the message status module 226 may be associated with identification of a template for displaying alarm data, populating the template with alarm data, outputting the alarm data to a display, e.g., by the alarm presentation module 228, etc. In one embodiment, color codes may be associated with each status message. In one example, a green status code may indicate to a user that an alarm has been processed and is ready to be acted upon, while a yellow status code may indicate generally that processing of the alarm has not yet been completed. As used herein, an alarm may be considered ready to be acted upon when information associated with the alarm has been populated in each field of a template identified for the alarm. In some embodiments, such as those in which at least a portion of the information associated with an alarm was not successfully retrieved, an alarm may be ready to be acted upon when less than each field in a template associated with an alarm has been populated. In such instances, the alarm processing module 224 may further indicate that certain information that was expected to be retrieved was not retrieved. In some embodiments, certain fields in a template may be designated as critical such that processing of an alarm may not be considered complete unless information associated with such fields has been retrieved.

The alarm analysis module 230 may analyze alarms to facilitate resolution of the alarms, among other functions. Such analysis may include categorizing alarms based on information associated with the alarm, such as the information stored in an alarm template described above. In one example, alarms may be categorized as actionable, requiring assistance, or missed. Actionable alarms may refer to alarms that require action to prevent an abnormal condition from occurring. The alarm analysis module 230 may identify actionable alarms by analyzing historical data or information associated with the alarms, in one embodiment. Such data or information may indicate a detailed description of the alarm and actions that were taken to resolve the alarm. The data or information may include certain statuses or keywords that may be parsed by the alarm analysis module 230 to identify known impending failures or anomalies. Such statuses may be received from the power generation system in association with receiving an alarm and/or from a user who has entered such information into an incident report, for example, upon making a determination or confirmation (e.g., if the status was received from the power generation system) that an abnormal condition has occurred or is impending, and hence should be designated as actionable, in one embodiment. In other embodiments, certain types of alarms may be associated with outages in a power generation system or components within the power generation system. These alarm types may also be classified as actionable alarms.

In certain embodiments, in addition to categorizing alarms, the alarm analysis module 230 may suggest certain actions, which may also be based on an analysis of historical information. For example, the alarm analysis module 230 may identify one or more actions that were taken (e.g., based on information in an incident report associated with the alarm), retrieve the one or more actions, and display the one or more actions in a template associated with the alarms. A user may view the suggested actions and determine whether to perform such actions. In some embodiments, the alarm analysis module 230 may initiate certain actions to resolve actionable alarms. For example, upon determining that a particular type of alarm causes an outage in a power generation system, the alarm analysis module 230 may send a command that may cause a power generation system or component to initiate a restart or other operation that may prevent an outage.

The alarm analysis module 230 may further facilitate responses to alarms by outputting a list of possible causes of the alarm. In one embodiment, the list may be generated for only certain types of alarms, for example, alarms for which the alarm analysis module 230 has a relatively high degree of certainty that it has successfully identified the cause. The degree of certainty may be determined based on an analysis of historical information associated with various causes of alarms. Certain causes of an alarm which are repeatedly identified in historical information as being associated with a particular alarm or type of alarm may indicate a relatively high degree of certainty for which the alarm analysis module 230 may reliably output a list of possible causes. Causes of an alarm that are not repetitive and/or not determined to be the actual cause of the alarm may be excluded from the list of possible causes. In one embodiment, actions that may have been taken in response to the alarm (as described above) may be based on the potential causes of the alarm.

Alarms classified as requiring assistance may refer to alarms that are associated with a power generation system or component that has already failed. In such instances, a customer, for example, who is served by a power generation system may receive assistance or support in responding to a failed power generation system. Information associated with an alarm requiring assistance, such as information stored in an alarm template (described above), may indicate that a power generation system has failed, for example. The alarm analysis module 230 may detect such an indication and perform various actions in response, such as notifying one or more users who may be responsible for providing support to the customer. The notification may include generating an incident report that includes details associated with the alarm and sending the report (e.g., via electronic mail, Short Messaging Service (SMS) text messaging, or other communication mediums) to the one or more users.

Alarms classified as missed may refer to alarms that resulted in an abnormal condition in a power generation system but were not identified as actionable alarms before the abnormal condition occurred. The alarm analysis module 230 may subsequently label at least some missed alarms as actionable as a result of the missed alarms not being identified before the abnormal condition occurred.

The alarm analysis module 230 may be performed using various computer programming languages. Example languages may include, but are not limited to, Matlab, C/C++, Perl, Java, or other compiled languages, byte-code interpreted languages, etc.

The alarm escalation module 232 may facilitate escalation of alarms. According to one configuration, a user may select an alarm associated with a power generation system for escalation. In addition to alarm information presented in a template associated with an alarm as described above, a user may enter additional details, notes, descriptions, etc., associated with an alarm. The alarm escalation module 232 may generate an incident report that includes such information and distribute the incident report to one or more users or organizations that may be responsible for resolving the alarm. In one example, the alarm escalation module 232 may send a message (e.g., electronic mail message, SMS text message, etc.) to electronic accounts associated with the one or more users or organizations notifying them about the alarm.

The above configuration in FIG. 2 is not meant to be limiting. Fewer or more modules may exist in other embodiments. Further, at least some of the functionality described above may be performed by one or more different modules. For example, the alarm escalation module 232 may also perform the functions associated with the alarm analysis module 230.

Figure 3:
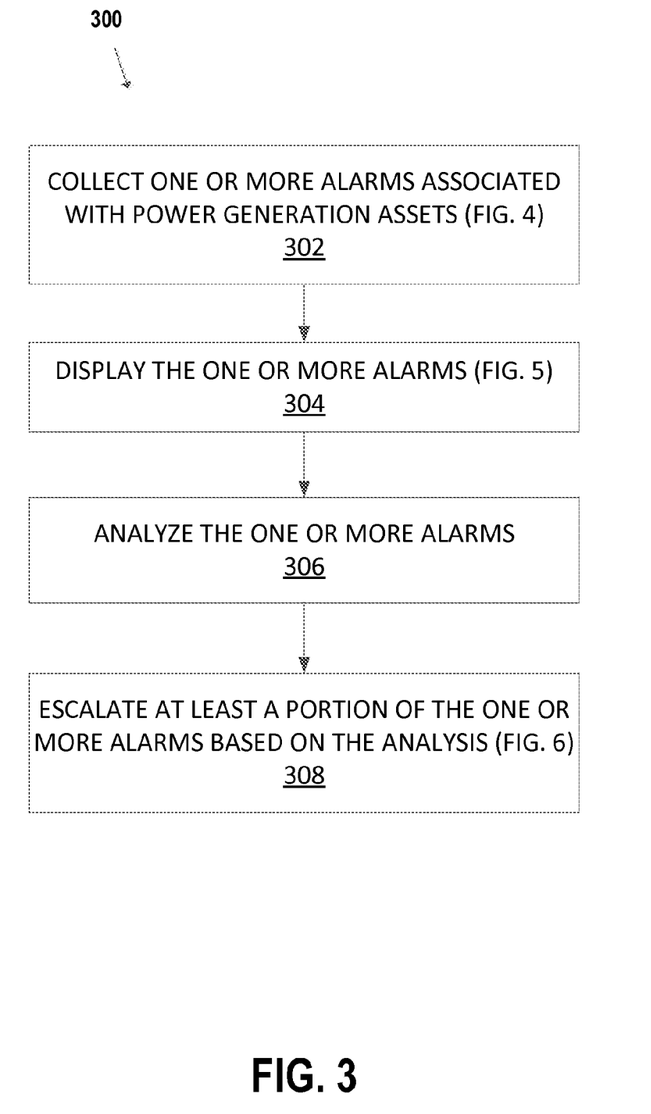
FIG. 3 illustrates an example flow diagram for methods according to an embodiment of the disclosure.

FIG. 3 depicts an example flow diagram 300 for a method according to one embodiment of the disclosure. One such method may begin at block 302, where one or more alarms associated with power generation assets may be collected. Processes associated with the collection are described in association with FIG. 4. At block 304, the one or more collected alarms may be presented, for example, to a user for viewing and analysis. Processes associated with presenting alarms are described in association with FIG. 5.

At block 306, the one or more collected alarms may be analyzed, e.g., by the alarm analysis module 230. As described, the alarm analysis module 230 may classify or categorize alarms based on historical information associated with certain types of alarms. In one embodiment, alarms may be classified as actionable (e.g., action is required to prevent an abnormal condition associated with the alarm from occurring), requiring assistance (e.g., an abnormal condition has already occurred and users or organizations providing support to a customer experiencing the abnormal condition may be notified to assist the customer with resolving the abnormal condition), and missed (e.g., a power generation system experienced an outage but the alarm associated with the outage was not classified as actionable, hence a missed opportunity to prevent an outage). Various other classifications of alarms may exist in other embodiments. Different actions or responses may be performed, e.g., by the alarm analysis module 230, based on an alarm's classification, as described above.

The collected alarms may be escalated, at block 308. Such escalation may include a user selecting one or more alarms for escalation, including additional descriptions or information associated with the alarms, and causing an incident report to be generated and distributed to one or more users or organizations, in one embodiment. Processes associated with escalating alarms are described in association with FIG. 6.

Figure 4:
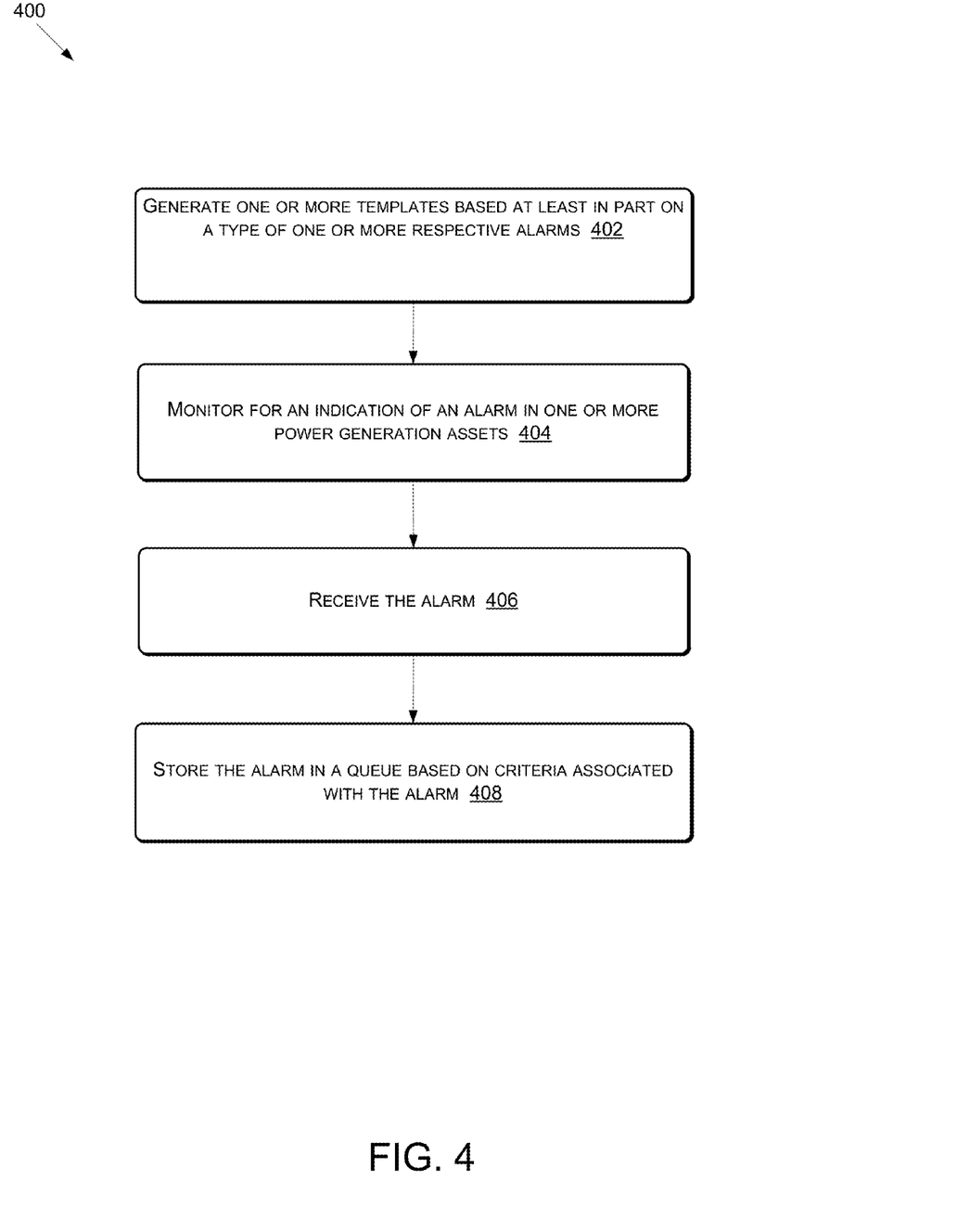
FIG. 4 illustrates an example flow diagram for collecting alarm information, according to an embodiment of the disclosure.

FIG. 4 illustrates an example flow diagram for collecting alarm information, according to an embodiment of the disclosure. The method may begin at block 402, where a template associated with various alarms may be generated, e.g., by the template generation module 220, in one embodiment. The template may include fields, components, graphical objects, etc., that may be associated with a particular type of alarm such that tailored information may be presented for each type of alarm, in one embodiment. In one embodiment, a user may utilize the template generation module 220 to select create a template, for example, using drag-and-drop operations to place GUI objects on a canvas area to form the template.

At block 404, one or more power generation assets, such as, but not limited to, a generator, turbine, or motor, may be monitored for an alarm, e.g., by the alarm monitoring module 222. An alarm may be received at block 406. In one embodiment, the alarm may be received from a sensor associated with an asset over a network, e.g., the network 105. The received alarm may be stored in a queue, e.g., by the alarm monitoring module 222, at block 408. In one embodiment, the alarm may be stored in a queue based on a type of the alarm, a priority associated with the alarm, and/or an age associated with the alarm. According to one example, newer, more critical alarms may be stored closer to the top of a queue such that they may be processed before older, less critical alarms.

Figure 5:
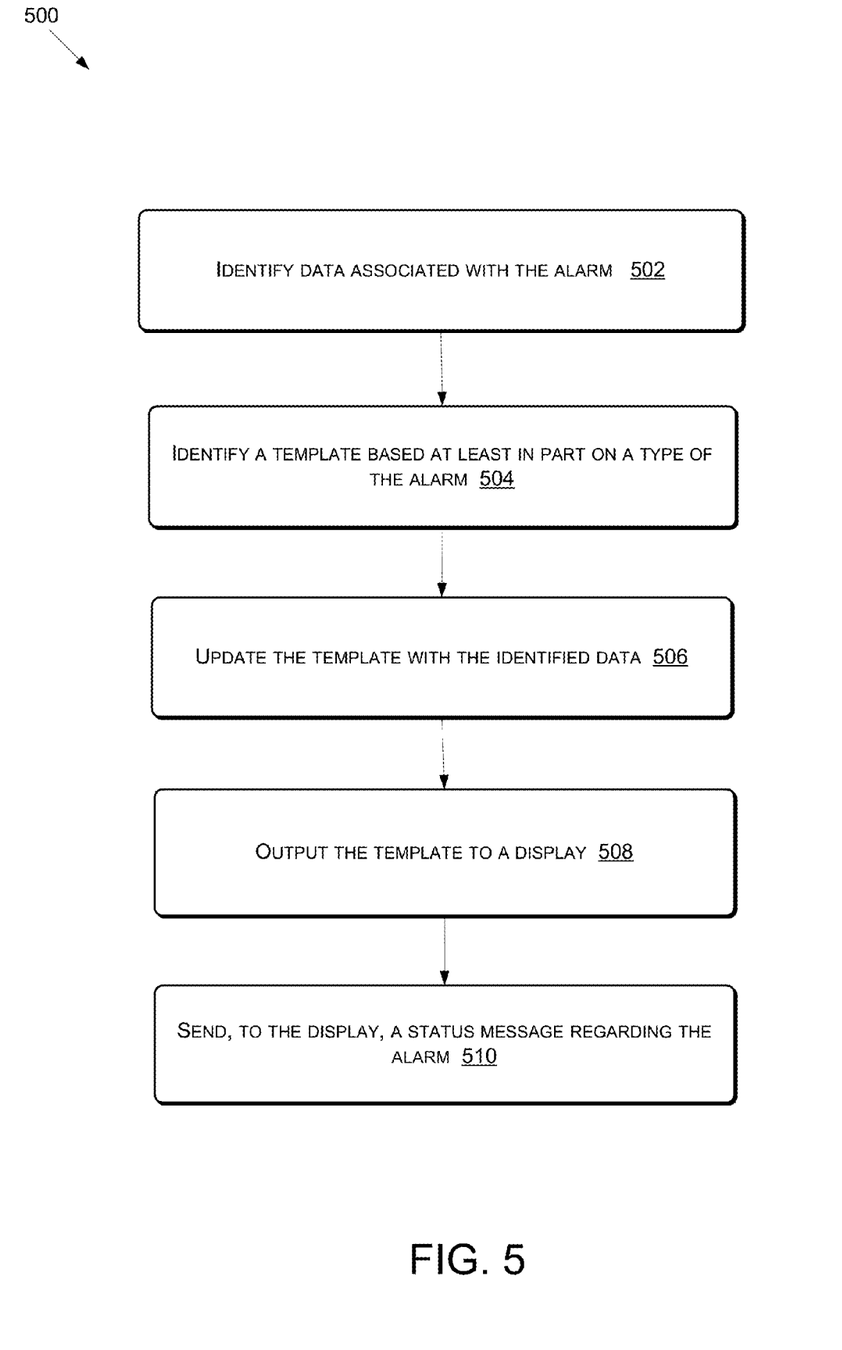
FIG. 5 illustrates an example flow diagram for presenting alarms and associated information, according to an embodiment of the disclosure.

FIG. 5 illustrates an example flow diagram for presenting alarms and associated information, according to an embodiment of the disclosure. The process may begin at block 502, where information associated with a type of a received alarm may be identified, e.g., by the alarm processing module 224. In one embodiment, the alarm information may be queried from a database storing information associated with an asset according to a time at which the alarm was received. A template, such as a template generated at block 402, may be identified based at least in part on a type of the alarm, at block 504. The template may be populated with the information associated with the alarm, at block 506, and the populated template may be output to a display, e.g., via the alarm presentation module 228, at block 508.

A notification regarding the status of an alarm may be provided, at block 510. In certain embodiments, in association with any block shown in FIGS. 4 and 5, a status message may be output to a display such that a user may be updated regarding the status of an alarm. For example, a user may receive a message that an alarm has been received, is being processed, and/or has been processed and is ready to be acted upon. More specific messages that may include details associated with the type of data being retrieved for an alarm, or other particular information, may be provided in other embodiments.

Figure 6:
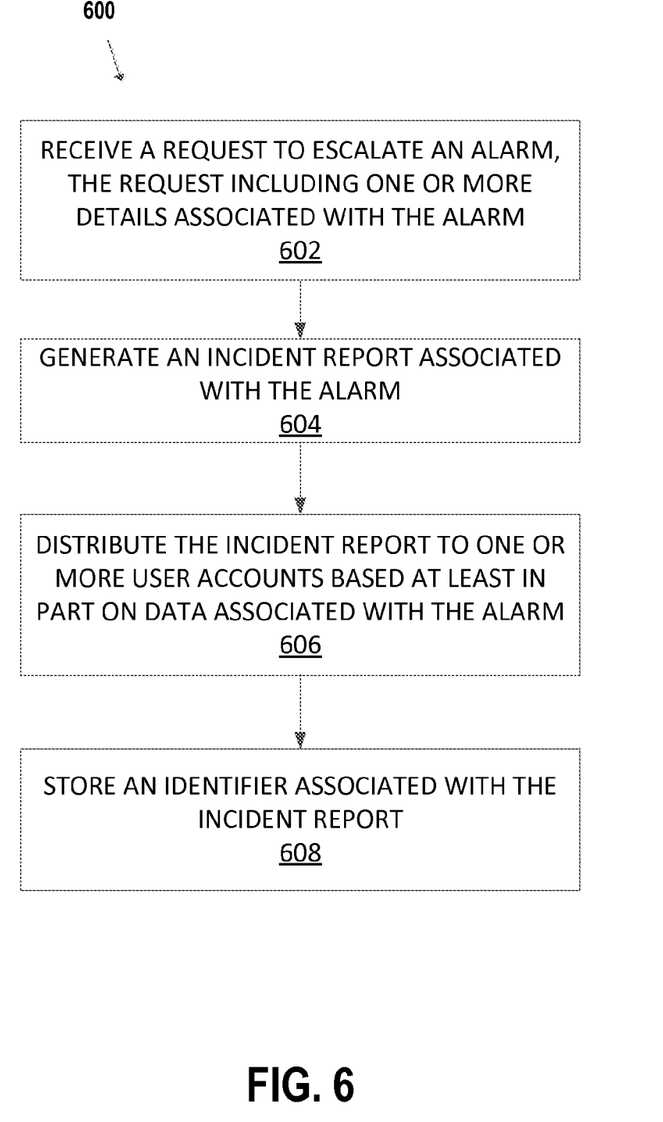
FIG. 6 illustrates an example flow diagram for escalating an alarm, according to an embodiment of the disclosure.

FIG. 6 illustrates an example flow diagram for escalating an alarm, according to an embodiment of the disclosure. The process may begin at block 602, where a request to escalate an alarm may be received. The request may include one or more details associated with the alarm. Such details may be entered by a user analyzing the alarms, in one embodiment, or may be included by the alarm analysis module 230 in FIG. 2 based on historical information associated with the alarm, in another embodiment.

An incident report associated with an alarm selected for escalation may be generated, at block 604. The incident report may include various information associated with the alarm such that one or more users or organizations that receive the escalated alarm may begin preventing or resolving abnormal conditions associated with the escalated alarm. The incident report may be distributed to the one or more users or organizations (e.g., electronic user accounts associated with the users or organizations, in one embodiment), at block 606. The user accounts may be selected based on information that may associate the users with the alarms. For example, alarm template information may indicate that certain users in an organization are experienced with handling certain types of alarms and may therefore disposition the alarms to these users. Other information may be utilized in other embodiments to select to which users or organizations alarms may be dispositioned. An identifier associated with the incident report may be generated and stored, at block 608.

The processes 300, 400, 500, and 600 are illustrated as logical flow diagrams, in which each operation represents a sequence of operations that can be implemented in hardware, software, or a combination thereof. In the context of software, the operations can represent computer-executable instructions stored on one or more computer-readable storage media that, when executed by one or more processors, perform the recited operations. Generally, computer-executable instructions can include control blocks, routines, programs, objects, components, data structures, and the like that perform particular functions or implement particular abstract data types. The order in which the operations are described is not intended to be construed as a limitation, and any number of the described operations can be combined in any order and/or in parallel to implement the process.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments.

What is claimed is:

1. A method comprising:
    receiving, by an alarm processing system comprising one or more computing devices, an alarm indicating an abnormal condition in a power generation asset;
    storing, by the alarm processing system, the alarm in a queue of a plurality of queues, wherein the storing of the alarm is based at least in part on at least one of a type of the alarm, a priority of the alarm, or an age of the alarm;
    processing, by the alarm processing system, the stored alarm for display, wherein the processing comprises:
        determining a first customized template of a plurality of templates associated with the stored alarm, the first customized template comprising one or more first fields corresponding to information associated with the stored alarm, wherein at least one field of the one or more first fields differs from one or more second fields of a second customized template associated with a different stored alarm;
        requesting the information corresponding to the one or more first fields of the customized template;
        receiving at least a portion of the requested information; and
        in response to receiving the at least a portion of the requested information, (i) updating the first customized template with the at least a portion of the requested information, (ii) outputting the first customized template to a display, and (iii) outputting a message to a display that indicates that the processing of the alarm is complete.

2. The method of claim 1, wherein the requested information associated with the alarm comprises data associated with the power generation asset.

3. The method of claim 1, wherein the requested information is identified based at least in part on a time at which the alarm was received.

4. The method of claim 1, wherein the power generation asset comprises at least one of a generator, a turbine, or a compressor.

5. The method of claim 1, wherein the message further indicates that the alarm is ready to be acted upon.

6. The method of claim 1, further comprising:
    determining, by the alarm processing system, that information associated with at least one field of the one or more fields was not received; and
    determining, by the alarm processing system, that the at least one field is a non-critical field based at least in part on the customized template;
    wherein the message that indicates that processing of the alarm is complete further indicates that information associated with the at least one field was not received.

7. The method of claim 1, further comprising:
    outputting, by the alarm processing system in association with storing the alarm in the queue, a first message associated with the alarm being received;
    outputting, by the alarm processing system in association with requesting the information corresponding to the one or more fields of the customized template, a second message associated with the alarm being processed; and
    outputting, by the alarm processing system in association with receiving the at least a portion of the requested information, a third message associated with processing of the alarm being complete, wherein processing of the alarm being complete indicates that the alarm is ready to be acted upon.

8. A system comprising:
    a power generation asset;
    a sensor coupled to the power generation asset;
    at least one memory that stores computer-executable instructions; and
    at least one processor configured to access the at least one memory, wherein the at least one processor is configured to execute the computer-executable instructions to:
        receive an alarm indicating an abnormal condition in the power generation asset;
        store the alarm in a queue of a plurality of queues, wherein the storing of the alarm is based at least in part on at least one of a type of the alarm, a priority of the alarm, or an age of the alarm;
        process the stored alarm for display, wherein the computer-executable instructions for the processing further comprise computer-executable instructions that configure the at least one processor to:
            determine a first customized template of a plurality of templates associated with the stored alarm, the first customized template comprising one or more first fields corresponding to information associated with the stored alarm, wherein at least one field of the one or more first fields differs from one or more second fields of a second customized template associated with a different stored alarm;
            request the information corresponding to the one or more first fields of the customized template;
            receive at least a portion of the requested information; and
            in response to receiving the at least a portion of the requested information, (i) update the first customized template with the at least a portion of the requested information, (ii) output the first customized template to a display, and (iii) output a message to a display that indicates that the processing of the alarm is complete.

9. The system of claim 8, wherein the requested information is identified based at least in part on a time at which the alarm was received.

10. The system of claim 8, wherein the power generation asset comprises at least one of a generator, a turbine, or a compressor.

11. The system of claim 8, wherein the message further indicates that an alarm is ready to be acted upon.

12. A method comprising:
    receiving, by an alarm processing system comprising one or more computing devices, an alarm indicating an abnormal condition in a power generation asset;

identifying, by the alarm processing system, historical information associated with the alarm;

determining, by the alarm processing system, a category associated with the alarm based at least in part on the historical information comprising actions that were previously taken in association with receiving the alarm, wherein the category indicates (i) that an abnormal condition associated with the alarm is preventable, (ii) that an abnormal condition associated with the alarm has occurred and requires assistance, or (iii) that the alarm was missed;

when the category indicates that the abnormal condition associated with the alarm is preventable, sending, to one or more user accounts associated with the alarm, a request to respond to the alarm before the abnormal condition occurs; and when the category indicates that the abnormal condition associated with the alarm has occurred, sending, to the one or more user accounts associated with the alarm, a request to resolve the abnormal condition.

13. The method of claim 12, further comprising:

receiving, by the alarm processing system, a request to escalate the alarm; and in response to the request, generating, by the alarm processing system, an incident report associated with the alarm.

14. The method of claim 12, wherein the one or more user accounts comprise one or more first user accounts, the method further comprising:

receiving, by the alarm processing system, additional information associated with the alarm;

associating, by the alarm processing system, the additional information with the incident report; and sending, by the alarm processing system, the incident report to one or more second user accounts associated with the alarm.

15. The method of claim 12, further comprising, when the alarm was missed, updating the category associated with the alarm to the category indicating that the abnormal condition associated with the alarm is preventable.

16. The method of claim 12, wherein the power generation asset comprises at least one of a generator, a turbine, or a compressor.

17. The method of claim 12, wherein the historical information comprises information associated with one or more incident reports associated with the alarm.

* * * * *